(12) United States Patent
Belcher et al.

(10) Patent No.: US 10,769,202 B2
(45) Date of Patent: Sep. 8, 2020

(54) MULTIPLE DISTANT MUSICIAN AUDIO LOOP RECORDING APPARATUS AND LISTENING METHOD

(71) Applicant: Harman International Industries, Incorporated, Stamford, CT (US)

(72) Inventors: Christopher M. Belcher, Lehi, UT (US); James D. Pennock, Salt Lake City, UT (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 15/852,649

(22) Filed: Dec. 22, 2017

(65) Prior Publication Data

US 2018/0121446 A1 May 3, 2018

Related U.S. Application Data

(63) Continuation of application No. 14/511,856, filed on Oct. 10, 2014, now Pat. No. 9,852,216.

(51) Int. Cl.
*G06F 17/00* (2019.01)
*G06F 16/60* (2019.01)
*G10H 1/36* (2006.01)

(52) U.S. Cl.
CPC ............. *G06F 16/60* (2019.01); *G10H 1/36* (2013.01); *G10H 1/361* (2013.01); *G10H 1/363* (2013.01)

(58) Field of Classification Search
CPC ........ G10H 1/0058; G10H 1/36; G10H 1/363; G10H 1/361
See application file for complete search history.

(56) References Cited

U.S. PATENT DOCUMENTS

| 9,094,636 | B1 | 7/2015 | Sanders et al. |
| 2008/0190271 | A1* | 8/2008 | Taub ............... G10H 1/0058 84/645 |
| 2010/0222906 | A1 | 9/2010 | Moulios |
| 2012/0097014 | A1 | 4/2012 | Matsumoto |
| 2013/0025437 | A1* | 1/2013 | Serletic ............. G10H 1/0025 84/634 |
| 2013/0310122 | A1* | 11/2013 | Piccionielli ......... G07F 17/3272 463/2 |

OTHER PUBLICATIONS

Owner's Manual, "JamMan Stereo Looper / Phrase Sampler Solo XT", Digitech by Harman, Oct. 24, 2012, 72 pages.

* cited by examiner

*Primary Examiner* — Thomas H Maung
(74) *Attorney, Agent, or Firm* — Brooks Kushman P.C.

(57) ABSTRACT

In one embodiment, an apparatus comprising a first audio looping device is provided. The first audio looping device is electrically coupled to a computing device. The first audio looping device is programmed to receive a first audio signal from a musical instrument and to store the first audio signal. The first audio looping device is further programmed to playback the stored first audio signal as a first audio loop a number of times and to transmit the first audio loop to a second audio looping device via the first computing device. The first audio looping device is further programmed to receive a second audio loop from the second audio looping device via the computing device.

17 Claims, 5 Drawing Sheets

MULTIPLE DISTANT MUSICIAN AUDIO LOOP RECORDING APPARATUS AND LISTENING METHOD

CROSS-REFERENCE TO RELATED APPLICATIONS

This application is a continuation of U.S. application Ser. No. 14/511,856 filed Oct. 10, 2014, now U.S. Pat. No. 9,852,216, issued Dec. 26, 2017, the disclosure of which is hereby incorporated in its entirety by reference herein.

TECHNICAL FIELD

Aspects disclosed herein generally relate to a multiple distance musician audio loop recording apparatus and method.

BACKGROUND

Musicians, such as guitarists, bassists, keyboard players, etc. may use an audio looping device to record a baseline rhythm for playback. The audio looping device plays back the underlying rhythm track (or loop) to allow the musician to play over the track with additional rhythms or solos. For example, the musician may record and set a length of an initial loop with the audio looping device so that additional layers of musical parts are played over the initial loop to build a multipart musical piece with a single instrument.

In one example, the audio looping device may be implemented in the form of a pedal that is positioned between the musical instrument and an amplifier. The musician may activate or deactivate recording a rhythm and subsequently activate the playback of the recorded loop via a switch on the pedal by foot or hand. The audio looping device, while implemented in the form of a pedal, may be daisy-chained with a number of additional pedals (e.g., distortion, chorus, and reverb) to enable the musician to achieve any number of desired audio outputs for his/her instrument. In another example, the audio looping device may be implemented into an integrated multi-effects unit along with a number of musical instrument effects that also enable the musician to achieve any number of desired audio outputs for his/her musical instrument. The recording of the loop and the playback of the recorded loops with an audio looping device (e.g., either as a pedal or integrated within the multi-effects unit) and the addition of various musical layers over the loop is generally viewed or seen as a single musician endeavor or "one man band."

SUMMARY

In one embodiment, an apparatus comprising a first audio looping device is provided. The first audio looping device is electrically coupled to a computing device. The first audio looping device is programmed to receive a first audio signal from a musical instrument and to store the first audio signal. The first audio looping device is further programmed to playback the stored first audio signal as a first audio loop a number of times and to transmit the first audio loop to a second audio looping device via the first computing device. The first audio looping device is further programmed to receive a second audio loop from the second audio looping device via the computing device.

In another embodiment, a computer-program product embodied in a non-transitory computer readable medium is provided and that is programmed to enable communication between a first audio looping device that plays back a first audio loop a first number of times and a second audio looping device that plays back a second audio loop a second number of times. The computer-program product comprising instructions to receive the first audio loop from the first audio looping device and to transmit the first audio loop to the second audio looping device to generate the second audio loop. The computer-program product comprises instructions to receive the second audio loop from the second audio looping device and to generate a notification to alert a user of the first audio looping device that the second audio loop from the second audio looping device has been received.

In another embodiment, an apparatus comprising a first audio looping device is provided. The first audio looping device is electrically coupled to a computing device. The first audio looping device is programmed to receive a first audio signal from a musical instrument and to store the first audio signal. The first audio looping device is further programmed to playback the stored first audio signal as a first audio loop a number of times and to transmit the first audio loop to a second audio looping device via the first computing device. The first audio looping device is further programmed to receive a second audio loop from the second audio looping device via the computing device. The second audio loop includes a second audio signal that is played back a second number of times.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof, and software which co-act with one another to perform operation(s) disclosed herein.

Various audio looping devices have been used by musicians as a single independent device. The musician may use the audio looping device to record a first loop (i.e., record a particular rhythm track for the purpose of having the recorded loop repeated or played back a number of times), set a length of the loop and sequentially add multiple audio parts (or overdub) over the first loop to build up a multipart musical piece on a single device. In one example, a guitarist may record a baseline rhythm track with the audio looping device and then have the audio looping device playback the recorded rhythm while the guitar plays a solo along with the recorded loop. In another example, a guitarist may record a baseline rhythm track with the audio looping device. While the audio looping device is playing the recorded baseline rhythm, the guitarist can overdub another rhythm track over the recorded baseline rhythm loop which is merged with the baseline loop such that both recorded parts are played back together. This enhances the level of creativity for the guitarist and aids in the overall production of music.

The genre of looping has always been a "one man band" endeavor, as audio looping devices are designed to allow a single musician to build up a complete looping song. It is recognized herein that an audio looping device can be provided to control and allow additional separate audio looping devices to be connected together and to work in conjunction with each other to allow for a more complex looping experience. Such a looping experience may include a single musician with multiple audio looping devices (i.e., that are synchronized with one another). In this case, the musician may couple multiple looping devices together and record a corresponding loop on each looping device. Each recorded loop at each corresponding audio looping device may be different from one another. To playback the recorded loops at the various audio looping devices, a master audio looping device may synchronize the loops as played back at each audio looping device to ensure that the multiple number of loops are played back at the proper sequence or timing (i.e., to prevent the loop from exhibiting a drift condition). One example of the manner in which audio looping devices may be synchronized with one another is set forth in co-pending U.S. application Ser. No. 14/042,283 (or U.S. Publication No. 2015/0094833), filed on Sep. 13, 2013 to Clements et al. The looping experience may also be extended to multiple musicians who each have an audio looping device. In this case, a guitarist can record a guitar loop at a first looping device and a bassist can record a bass loop at a second looping device. The first looping device may be set as a master and synchronize the playback of the guitar loop and the bass loop to ensure that they start at the same time.

In addition to those noted above, aspects disclosed herein generally enable multiple musicians in remote locations to work collaboratively on musical pieces and to build such musical pieces in real time. This aspect may enable musicians to collaborate on a piece of music, a live action performance that can even have crowd sourced input, and/or provide a relaxing way to practice and perform music casually with others in a musical social networking context. For example, a first musician in a first location may transmit a first recorded loop from a first looping device via a computer network to a second looping device positioned in a different location from the first location. A second musician associated with the second looping device may then receive the first recorded loop and record a second recorded loop over the first recorded loop. The second musician may then transmit both the first recorded loop and the second recorded loop back to the first musician or to another musician (e.g., another musician who is located in a different location than the first and the second musician) where subsequent recorded loops can be recorded along with the first recorded loop and the second recorded loop. These aspects and others will be described in more detail below.

Figure 1:
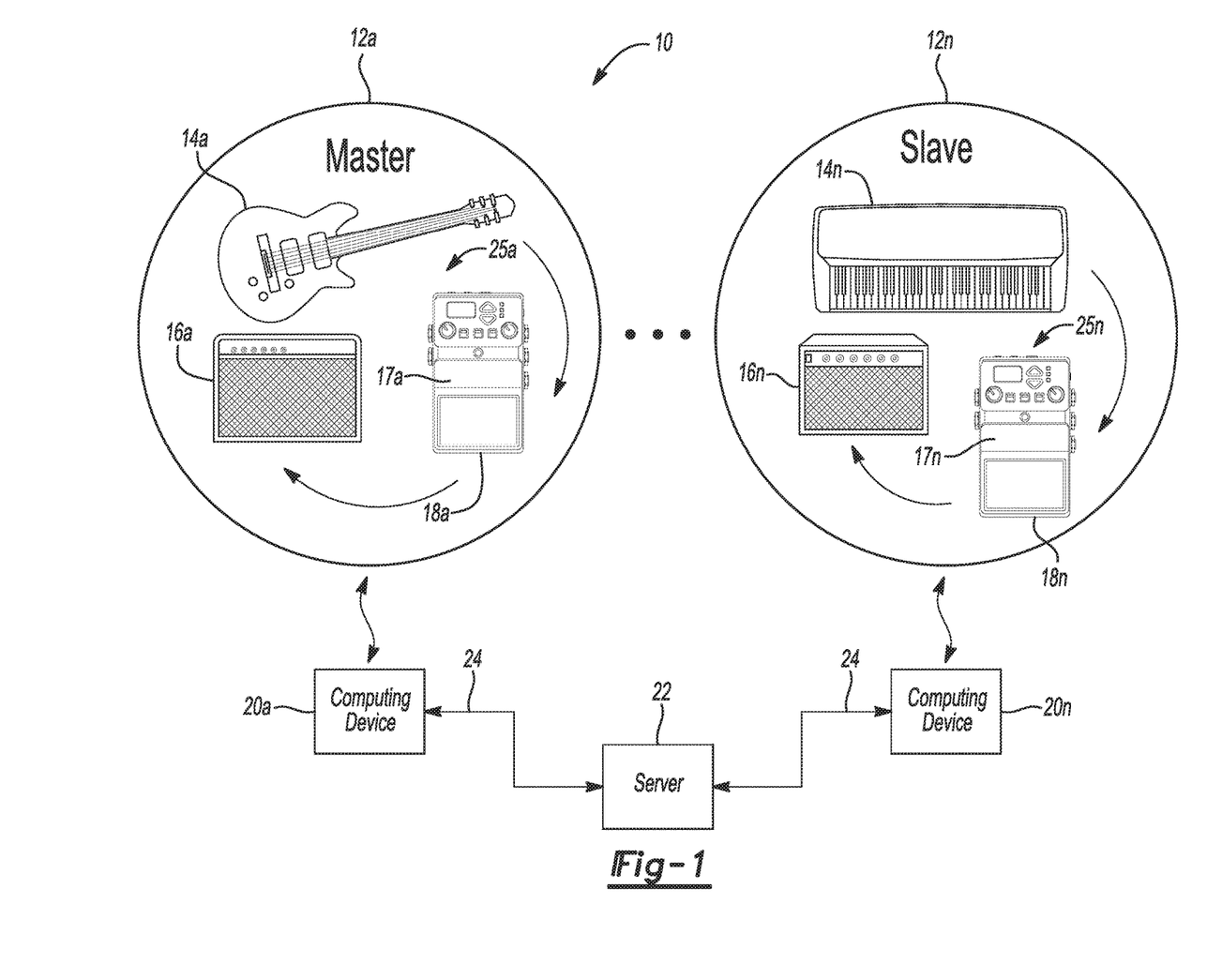
FIG. 1 depicts a system for transmitting audio loops between musicians in accordance to one embodiment.

FIG. 1 depicts a system 10 for transmitting audio loops between musicians 12a-12n ("12") in accordance to one embodiment. A number of musicians 12 is illustrated and each musician 12 is configured to play a particular musical instrument 14a-14n ("14"). For example, musician 12a may be a guitarist that plays the guitar 14a and musician 12n may be a keyboardist that plays the keyboard 14n. A corresponding amplifier 16a-16n ("16) is provided for each musician 12 to amplify an audio output from each instrument 14n. Each musician 12 may also include a corresponding audio looping device 18a-18n. For example, the guitarist 12a may record and play back an audio loop (or guitar loop) from the guitar via the audio looping device 18a and the keyboardist 12n may record and playback an audio loop (or keyboard loop) via the audio looping device 18n.

It is recognized that any number of instruments 14 may be used for the corresponding audio looping devices 18 for the purpose of recording and playback of various audio loops. In general, each audio looping device 18 is configured to record a corresponding piece of music (e.g., loop) for its corresponding instrument 14 and to playback the recorded loop which can be repeated any number of times (e.g., this can be set by the musician at the audio looping device 18). For example, the guitarist 12a may record a rhythm (or lick) and playback the rhythm as a guitar loop at the audio looping device 18a; the bassist 12b may record a rhythm (or bass line) and playback the rhythm as a bass loop at the audio looping device 18b, and the keyboardist 12n may record a rhythm and playback the rhythm as a keyboard loop at the audio looping device 18n. While each audio looping device 18 is generally shown as a pedal, it is recognized that the audio looping devices 18 may be integrated into a multi-effects unit which comprises a number of different effects for modifying the audio output of a particular instrument 14.

The system 10 includes any number of computing devices 20a-20n ("20") that are electrically coupled to the various audio looping devices 18a-18n, respectively. It is recognized that each musician 12 and the corresponding audio looping device 18 (in addition to the computing device 20) may be located in different locations from one another. Each audio looping device 18 includes a transceiver 17 for wirelessly communicating with a corresponding computing device 20. For example, the audio looping device 18a may wirelessly transmit a first audio loop to the computing device 20a. Alternatively, the audio looping device 18n may wirelessly transmit a second audio loop to the computing device 20n. It is recognized that any of the audio looping devices 18 may be hardwire coupled to corresponding computing devices 20. A server (or computing device) 22 facilitates communication between the computing device 20a and the computing device 20n. For example, the server 22 may communicate with the computing device 20a and the computing device 20n via a data communication link 24 such as, but not limited to, a Transmission Control Protocol/Internet Protocol (TCP/IP) or other suitable mechanism.

In operation, the musician 12a may play the instrument 14a and record a guitar loop (or first audio loop) which is stored on the audio looping device 18a. The musician 12a may then proceed to wirelessly transmit the first audio loop to the computing device 20a. In this case, the musician 12a may select at least one control 25a on the audio looping device 18a for uploading or transmitting the first audio loop to the computing device 20a. The at least one control 25a may comprise any number of switches (or buttons) which when selected by the musician 12a, proceeds to upload the first audio loop to the computing device 20a. It is recognized that the audio looping device 18a may store and transmit the first audio loop as a .WAV file or other suitable file format to the computing device 20a. The computing device 20a may execute an application for providing a user interface such that the first audio loop can be transmitted from the computing device 20a and onto the server 22 for subsequent transmission to the musician 12n to receive the first audio loop.

The application, when executed on the computing device 20, may allow various musicians 12a to select the corresponding musician 12n to receive an audio loop. For example, each musician 12 may establish a user name that corresponds to himself/herself on a corresponding computing device 20 such that the corresponding computing device 20 provides the user name to the server 22. The server 22 stores the user name and corresponding identification of the computing device 20a that created the user name. The server 22 may provide a listing of user names that correspond to the various musicians 12 on the various computing devices 20. Thus, this condition enables the musician 12a to select the musician 12n that is the intended recipient of the first audio loop via the user interface on the computing device 20a. It is recognized that musician 12n shares their corresponding user name with the musician 12a so that the musician 12a can select the user name when he/she is ready to transmit the first audio loop. This condition applies equally in the other direction (e.g., musician 12a shares his/her corresponding user name with the musician 12n so that the musician 12a may receive an audio loop from the musician 12n).

The computing device 20a transmits the first audio loop to the server 22 in response to the musician 12a selecting the desired musician 12n to receive the first audio loop via the user interface. The server 22, in turn, transmits the first audio loop to the computing device 20n for the musician 12n. The musician 12n may then control the computing device 20n to wirelessly transmit the first audio loop to the transceiver 17n on the audio looping device 18n. Alternatively, the computing device 20n may automatically transmit the latest audio loop that it receives to the audio looping device 18n once the computing device 20n recognizes or detects the presence of the audio looping device 18n. It is recognized that each audio looping device 18 will be paired with its corresponding computing device 20 prior to the audio looping device 18 transmitting/receiving various audio loops to/from the computing device 20a. The musician 12n may then begin playing back the first audio loop (e.g., a guitar loop) and also create a second audio loop (e.g., a bass loop) that can be stored and synchronized with the first audio loop. The musician 12n may then upload both the first and the second audio loop to the computing device 20n via the at least one control 25 which is then transmitted to the server 22 and subsequently back to the computing device 20a and to the audio looping device 18a of the musician 12a. The foregoing condition is performed if the musician 12n selects the audio looping device 18a of the musician 12a, via the computing device 12n, to be the desired destination. It is recognized that the musician 12n may transmit the first and the second audio loop to another musician (e.g., other than the musician 12a) or alternatively to the musician 12a and another musician not shown in FIG. 1. As can be seen with the above description, the embodiments enable a multiple number of musicians who are located in different geographical regions to work on a combined audio track with multiple audio looping devices that are running independent of one another.

Figure 2:
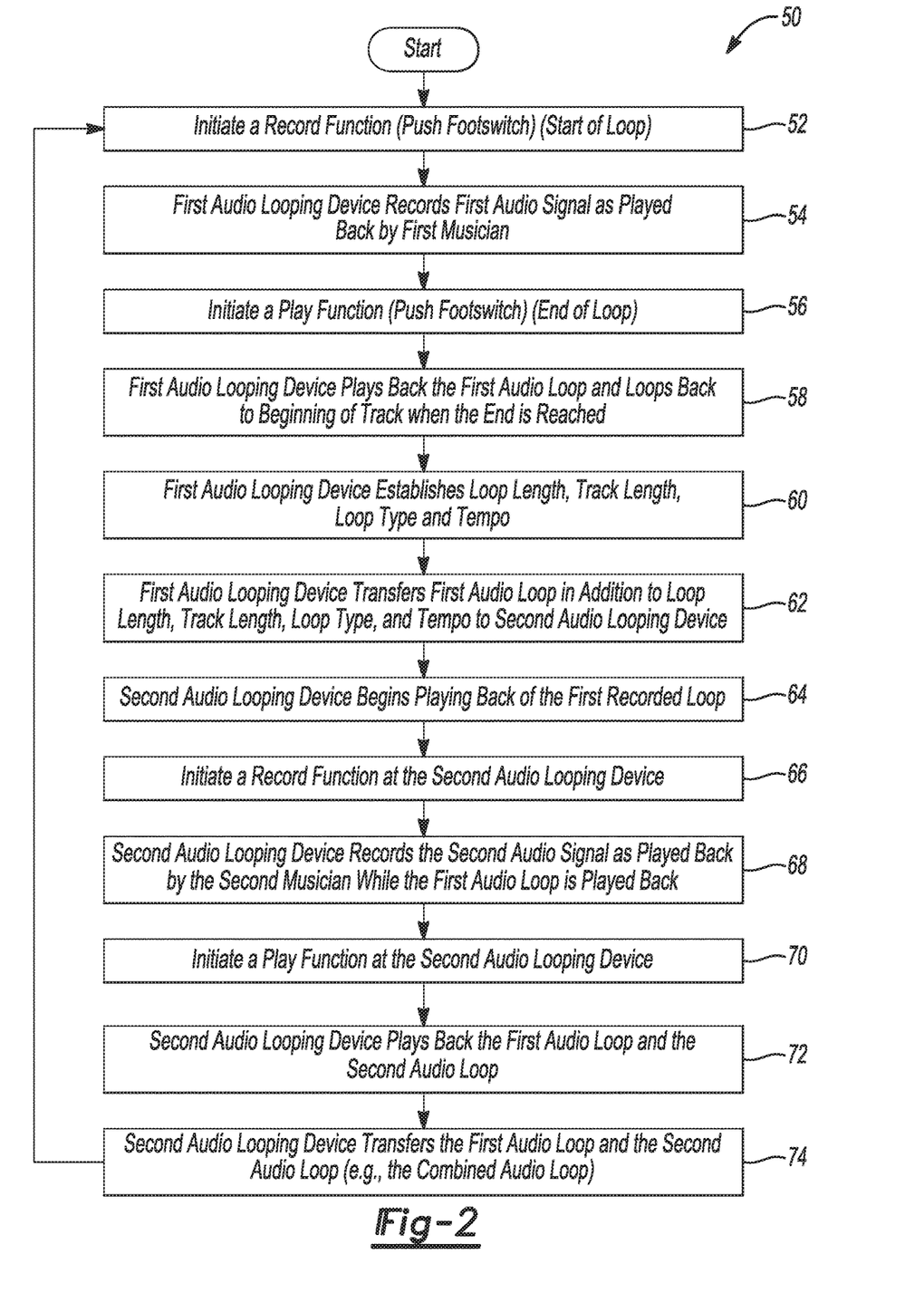
FIG. 2 depicts a method for generating and transmitting a first recorded loop from the first looping device to a second looping device and the subsequent generation and transmission of a second recorded loop back to the first looping device in accordance to one embodiment.

FIG. 2 depicts a method 50 for generating and transmitting the first audio loop from the audio looping device 18a to the second looping device 18n and the subsequent generation and transmission of the second audio loop back to the first looping device 18a in accordance to one embodiment.

In operation 52, the audio looping device 18a receives an indication from the musician 12a to initiate recording the first audio loop. For example, a foot switch (not shown) may be toggled by the musician 12a to initiate recording a musical piece that the musician 12a intends to play on the musical instrument 14a.

In operation 54, the audio looping device 18a records the musical piece that the musician 12a is presently playing on the musical instrument 14a to provide the first audio loop.

In operation 56, the audio looping device 18a initiates a play function. In this operation, the musician 12a toggles the foot switch to indicate that an end of the first audio loop has been reached.

In operation 58, the audio looping device 18a plays back the first audio loop and loops back to the beginning of the recorded track of the musical piece (or loops back to the start of the first audio loop) when the end of the first audio loop is reached.

In operation 60, the audio looping device 18a establishes a loop length, a track length, a loop type and a tempo of the first audio loop. The loop length is generally the overall length of time of the first audio loop. The track length is an overall length of blocks of data that forms the first audio loop. It is recognized that the blocks of data that form the first audio loop may comprise audio data and non-audio data such as blocks of silent data. Each block may include 32, 64, 128, etc. samples of data (or 32, 64, 128, etc. samples per block). The loop tempo is generally defined as a number of beats per minute and/or beats per measure of the first audio loop. The loop type may be a fade out type, an instantaneous stop type, or an immediate stop type. The fade out type may be a loop that is created by the musician 12 to fade away at an end of the loop. The instantaneous stop type may be a loop that stops at a start point of the next first audio loop. The immediate stop loop (or "loop finish") is set or programmed to stop playing the loop immediately.

In operation 62, the audio looping device 18a (or the transceiver 17a) wirelessly transmits the first audio loop and each of the loop length, the track length, loop type, and the tempo of the first audio loop to the computing device 20a and subsequently to the audio looping device 18n via the server 22 and the computing device 20n. This operation may be automatically performed once the computing device 20n detects the presence of the audio looping device 18*n*. The audio looping device 18*n* and/or the computing device 20*n* may overwrite previously received or stored audio loops with the first audio loop. In other words, the last recorded audio loop wins and is stored on the corresponding audio looping device 18*n*. The audio looping device 18*n* stores the first audio loop and first loop information (e.g., the loop length, track length, loop type, and the tempo of the first audio loop).

It is recognized that each of the computing devices 20*a*-20*n* may be arranged to allow its corresponding musician 12*a*-12*n*, respectively, to save and store any previously recorded and/or received audio loops and corresponding loop information (e.g., the loop length, track length, loop type, and the tempo of the corresponding audio loop) onto the corresponding computing devices 20*a*-20*n* after such recorded and/or received audio loops have been received. For example, in connection with the first audio loop and first loop information that is received at the audio looping device 18*n*, each of the computing devices 20*a* and 20*n* may store the first audio loop and the first loop information thereon for later use. In another embodiment, each computing device 20*a* may simply overwrite the previously received audio loop and received loop information with the latest audio loop and the latest loop information that are received. This aspect will be discussed in more detail below.

In operation 64, the audio looping device 18*n* begins playing back the first audio loop. The audio looping device 18*n* plays back the first audio loop in accordance to the loop information (e.g., the loop length, the track length, the loop type, and the tempo).

In operation 66, the audio looping device 18*n* receives an indication from the musician 12*n* to initiate recording a second audio loop. For example, a foot switch (not shown) may be toggled by the musician 12*a* to initiate recording a musical piece that the musician 12*n* intends to play on the musical instrument 14*n* while the first audio loop is being played back. Thus, the second audio loop is a combined audio loop that includes the musical piece that the musician 12*n* intends to play while the first audio loop is being played back in addition to the first audio loop itself.

In operation 68, the audio looping device 18*n* records the musical piece that the musician 12*n* plays in addition to the first audio loop to generate the combined audio loop. The combined audio loop includes the musical piece that is simultaneously played along with the first audio loop (e.g., the second audio loop) in addition to the first audio loop.

In operation 70, the audio looping device 18*n* initiates a play function. In this operation, the musician 12*n* toggles the foot switch to indicate that an end of the second audio loop has been reached. When the second audio loop has been recorded, the audio looping device 18*n* synchronizes the second audio loop with the first audio loop and subsequently provides the combined audio loop. Prior to playback, it is generally necessary to synchronize the loops (e.g., the first audio loop and the second audio loop) to ensure that each loop has the same starting point and to ensure that both the loops as played back by the audio looping device 18*n* do not drift with respect to one another. It is recognized that the audio looping device 18*n* also generates the loop information (e.g., the loop length, the track length, the loop type, and the tempo) for the second audio loop in which the second audio loop is simultaneously played along with the first audio loop. It is further recognized that the second audio loop may have an overall loop length that is set to the loop length of the first audio loop or to an integer multiple of the loop length of the first audio loop. For example, if the loop length of the first audio loop is three minutes and twenty seconds, the loop length of the second audio loop may have a loop length of three minutes and twenty second, or six minutes and forty seconds, and so on. The overall loop length of the second audio loop will be set or established by the musician 12*n* during the recording operation. In addition, if the musician 12*n* ends the recording of the second audio loop prior to an expiration of the first audio loop, then the second audio looping device 18*n* pads the second audio loop with silence until the first audio loop expires. The musician 12*n* may also establish the loop type for the second audio loop (e.g., fade out, instantaneous stop, or immediate stop).

In operation 72, the audio looping device 18*n* plays back (or loops) the combined audio loop which includes the second audio loop as generated by the musician 12*n* and the first audio loop. During the play back of the combined audio loop, the first audio loop is synchronized with the second audio loop.

In operation 74, the audio looping device 18*n* wirelessly transmits the combined audio loop to the computing device 20*n* and subsequently to the audio looping device 18*a* via the server 22 and the computing device 20*a*. The audio looping device 18*a* may overwrite the first audio loop as recorded in operation 58 as part of a file transfer operation. In this case, the audio looping device 18*a* overwrites the previous audio loop (e.g., the first audio loop) with the most recent audio loop (e.g., the combined audio loop). This aspect will be discussed in more detail connection with method 100 of FIG. 3. The audio looping device 18*n* also transmits the loop information (i.e., the loop length, track length, loop type, and tempo) for at least one of the first audio loop and the second audio loop to the computing device 20*n* along with the combined audio loop.

It is recognized that the combined audio loop may be transmitted to a different musician (i.e., not the musician 12*a*). For example, the computing device 20*n* may transmit the second audio loop to a computing device associated with a different musician.

Figure 3:
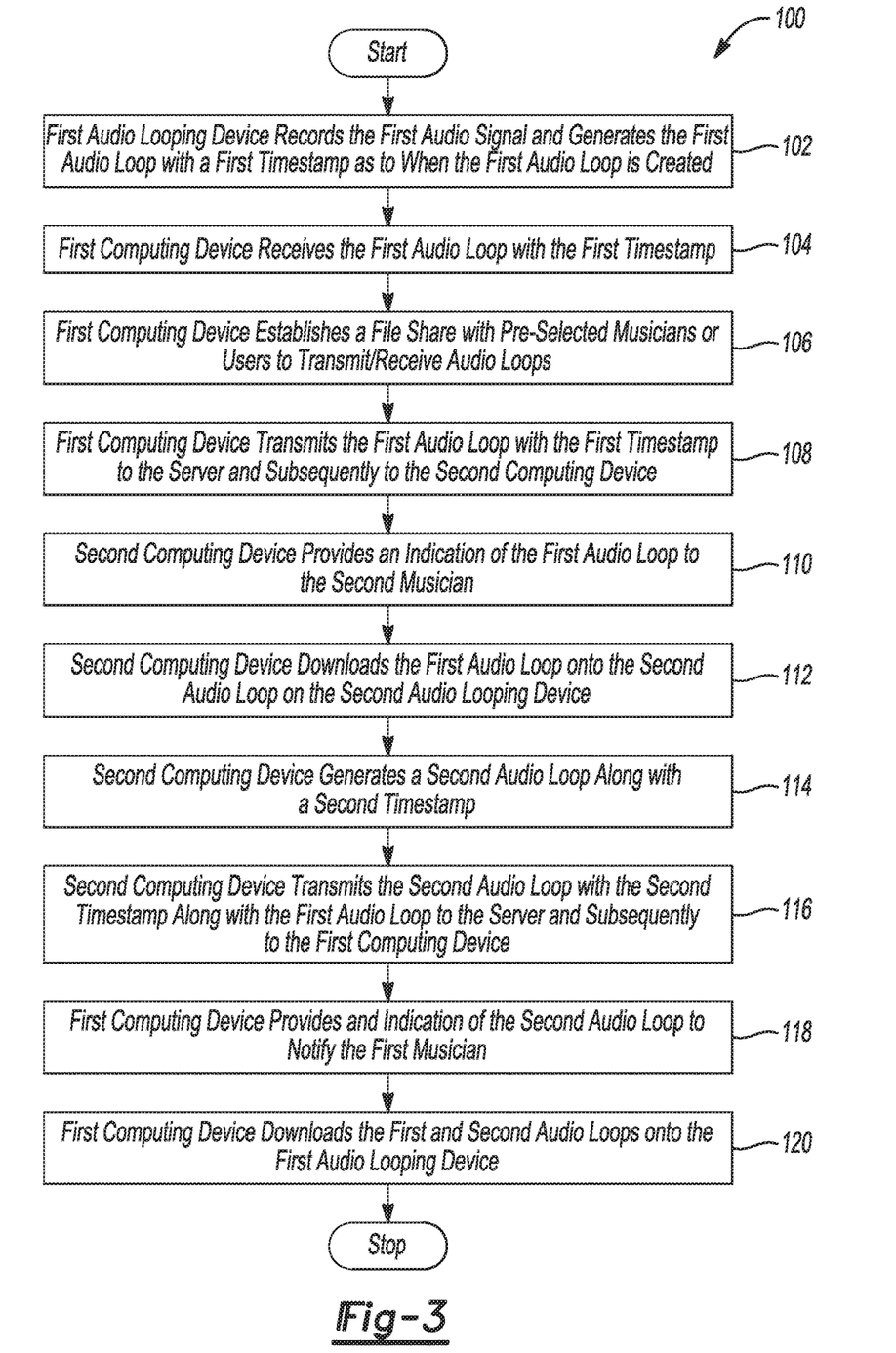
FIG. 3 depicts a method for generating timestamps for each of the first and the second recorded loops in accordance to one embodiment.

FIG. 3 depicts a method 100 for generating timestamps for each of the first and the second audio loops in accordance to one embodiment. The computing devices 20*a*-20*n* may use the timestamps to indicate which audio loop is the most recent audio loop that has been created so that the most recent loop and its corresponding loop information can be stored on a corresponding audio looping device 18.

In operation 102, the audio looping device 18*a* records the musical piece that is played by the musician 12*a* to generate the first audio loop and the first loop information (e.g., the loop length, the track length, the loop type, and the tempo for the first audio loop). The audio looping device 18*a* generates a first timestamp corresponding to a time in which the first audio loop and the first loop information is generated.

In operation 104, the audio looping device 18*a* transmits the first audio loop including the first timestamp and the first loop information to the computing device 20*a*.

In operation 106, the computing device 20*a* is arranged by the musician 12*a* to establish a file share arrangement with other musicians selected by the musician 12*a*. As noted above, the computing device 20*a* executes software on hardware thereof to enable the musician 12*a* to select which musician(s) 12 is to receive the first audio loop and the first loop information.

In operation 108, the computing device 20*a* may then transmit the first audio loop and the first loop information with the first timestamp to the server 22. In turn, the server 22 transmits the first audio loop, the first loop information, and the first timestamp to the computing device 20 that is selected at the computing device 20a. For purposes of illustration, it will be assumed that the musician 12n (i.e., the computing device 20n) receives the first audio loop, the first loop information, and the first timestamp.

In operation 110, the computing device 20n provides an indication to the musician 12n that the first audio loop has been received.

In operation 112, the computing device 20n downloads the first audio loop, the first loop information, and the first timestamp onto the audio looping device 18n.

In operation 114, the audio looping device 18n records the musical piece that the musician 12n plays in addition to the first audio loop to generate the combined audio loop. As noted above, the combined audio loop includes the musical piece that is played along with the first audio loop (e.g., the second audio loop) in addition to the first audio loop. The audio looping device 18n also generates second looping information (i.e., the loop length, the track length, the loop type, and the tempo for the second audio loop). The audio looping device 18n generates a second timestamp corresponding to a time in which the second audio loop (or the combined audio loop) is generated thereof. The second timestamp will reflect that the second audio loop (or the combined audio loop) has been created at some time after the first audio loop was created.

In operation 116, the audio looping device 18n wirelessly transmits the combined audio loop, the first loop information (for the first audio loop), the second loop information (for the second audio loop), and the second timestamp to the computing device 20n. In turn, the computing device 20n transmits the same to the server 22 and to the computing device 20a.

In operation 118, the computing device 20n provides an indication to the musician 12n that the combined audio loop has been received to notify the musician 12a. The computing device 20a recognizes that the second timestamp is later in time than the first timestamp and thus, this version that may be stored over the first audio loop. As noted above, the computing device 20a may or may not overwrite the first audio loop when subsequent audio loops are received.

In operation 120, the computing device 20a downloads the combined audio loop, the second loop information, and the second timestamp onto the audio looping device 18a. The audio looping device 18a overwrites the first audio loop and the first timestamp with the combined audio loop and the second timestamp in response to determining that the second timestamp indicates that the combined audio loop has been created after the first audio loop was created.

Figure 4A:
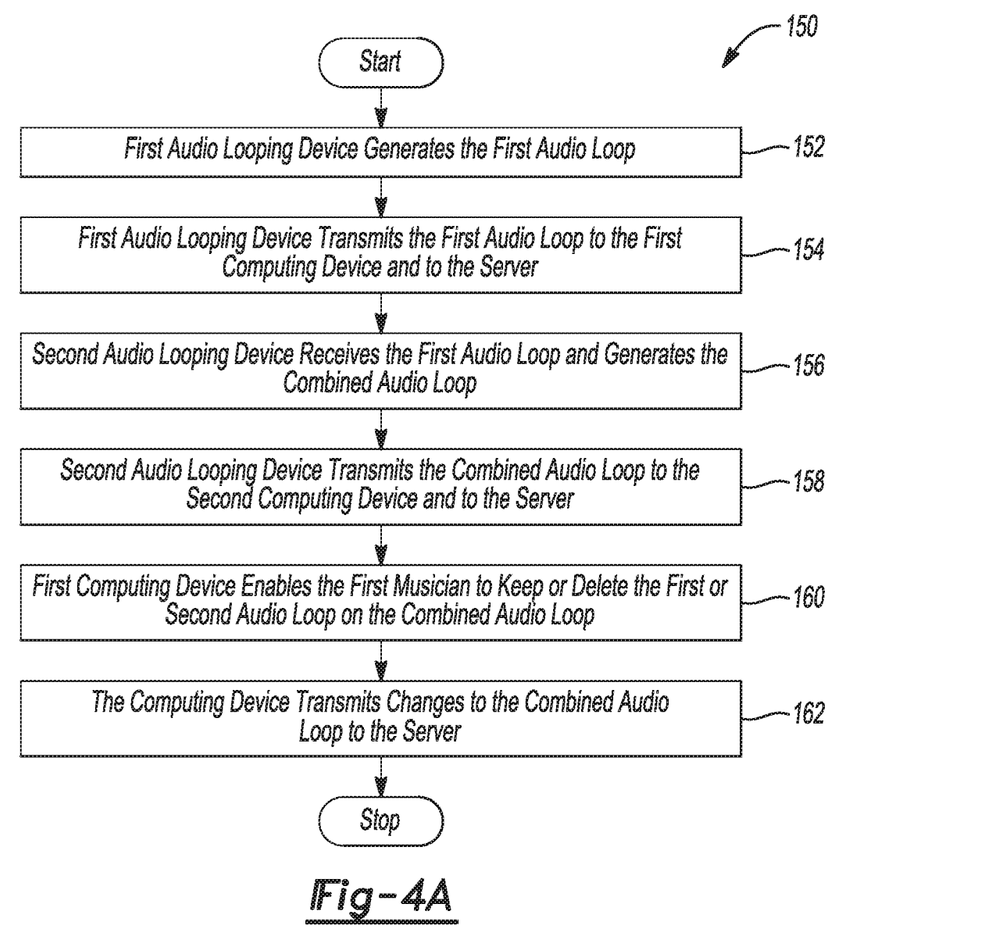
FIGS. 4A-4C depict various methods for managing recorded loops in accordance to one embodiment.

FIG. 4A depicts a method 150 for managing a multiple audio loops in accordance to one embodiment.

In operation 152, the audio looping device 18a stores the first audio loop and the first loop information as noted above. In this case, the musician 12a creates the first audio loop and may be assigned administrative privileges at the computing device 20a since the musician 12a was the first to create the audio loop.

In operation 154, the audio looping device 18a wirelessly transmits the first audio loop and the first loop information to the computing device 20a. In turn, the computing device 20a transmits the first audio loop to the server 22 and the server 22 transmits the same to the computing device 20n.

In operation 156, the audio looping device 18n receives the first audio loop and the first loop information from the computing device 20n. The audio looping device 18n generates the combined audio loop (e.g., the first audio loop and the second audio loop) and the second loop information as noted above.

In operation 158, the audio looping device 18n transmits the combined audio loop, the first loop information and the second loop information to the computing device 20n. In turn, the computing device 20n transmits the same to the server 22.

In operation 160, the computing device 18a receives the combined audio loop, the first loop information, and the second loop information. As noted in operation 152, the musician 12a is deemed to have administrative rights since the musician 12a was the first to create the audio loop. This in turn provides the musician 12a the ability to revise the combined audio loop either at the audio looping device 18a, or at the computing device 20a. For example, the musician 12a may remove the second audio loop on the combined audio loop if the musician 12a does not like what was added by the musician 12n at either the computing device 20a or the audio looping device 18a. The computing device 18a enables the musician 12a to listen to the second audio loop prior to the combined audio loop being downloaded to the audio looping device 18a. If the musician 12a does not like the second audio loop, a user interface (not shown) on the computing device 18 enables the user to delete the combined audio loop (or at least the second audio loop).

In general, when the first audio loop is created, the audio looping device 18a that generates the first audio loop electronically provides identification along with the first audio loop. The identification indicates which audio looping device 18 originated (or generated) the first audio loop and the first loop information. Such information is sent to the computing devices 20 and to the server 22. The computing device 20 that is directly paired with the originated audio looping device 18 (e.g., in our example the computing device 20a and the audio looping device 18) will also have the ability to revise the combined audio loop. In this case, during the initial pairing operation between the audio looping device 18a and the computing device 20a, the audio looping device 18a provides its identification to the computing device 20a so that the computing device 20a understands which audio looping device 18a it is wirelessly communicating with. Thus, in the case, when the computing device 20a receives the identification from the audio looping device 18a, the computing device 20a recognizes that the musician 12a can revise the combined audio loop at a user interface thereof since it wirelessly communicates with the audio looping device 18a and the indication provided by the audio looping device 18a indicates that it was the first to generate the first audio loop. It is recognized that the foregoing identification between the audio looping device 18a and the computing device 20a may apply to other audio looping devices 18 and computing devices 20.

In operation 162, the computing device 20a transmits any changes performed by the musician 12a at either the audio looping device 18a or the computing device 20a on the combined audio loop to the server 22. The server 22 will then transmit the revised combined audio loop to the corresponding computing devices 20 that communicated with the various audio looping devices 18 that provided loops to the combined audio loop.

In general, the operations noted above in connection with FIG. 5 illustrates the example in which the musician who is the first to record the first audio loop is deemed the master editor of any loops and any loop information generated thereafter which incorporate the first audio loop. Consider the example of a guitarist who creates a first guitar loop and has an idea of what a subsequent drum track and bass track should sound like. In this case, the guitarist receives the drum track and the bass track (each as loops) along with the underlying guitar loop and determines that he/she is not happy with the drum track. In this case, the guitarist may remove the drum track and leave the guitar and bass tracks (or loops) intact. The guitar and bass loops may be sent out again to the drummer (i.e., with the drum track removed) so that the drummer can record another drum loop with the guitar and bass loop.

Figure 4B:
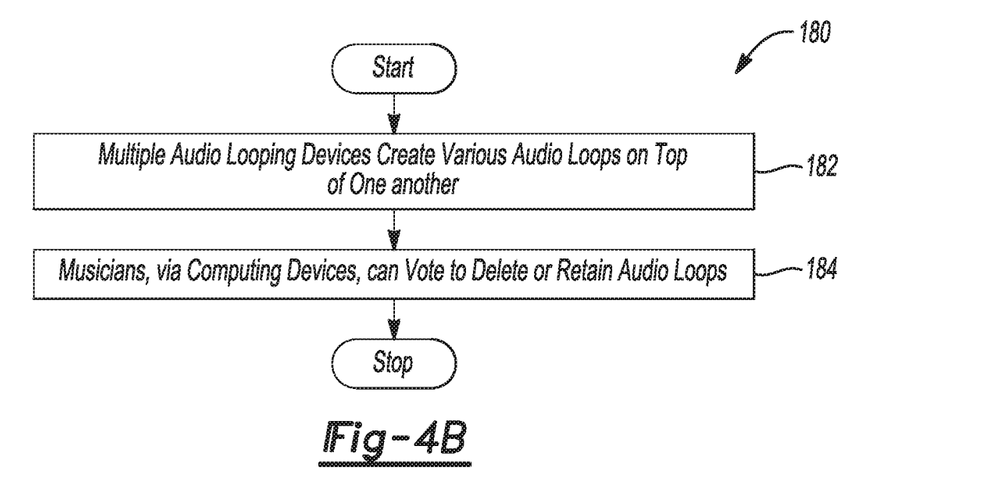

FIG. 4B depicts a method 180 for voting on various audio loops created by musicians 12 as performed by band members (or other interested persons/musicians) in accordance to one embodiment.

In operation 182, a multiple number of audio looping devices 18 generate or create various audio loops and loop information for particular instruments 14. For example, a lead guitarist may generate a lead guitar loop at the audio looping device 18a, a rhythm guitarist may generate a rhythm guitar loop at the audio looping device 18b, and a drummer may generate a drum loop at the audio looping device 18n. It is recognized that for each loop that is created, each will have corresponding loop information.

In operation 184, the corresponding loops generated in operation 182 may be electronically transmitted to the various computing devices 20a-20n associated with the lead guitarist, the rhythm guitarist, and the drummer where each of these musicians 20 can vote via their respective computing device 20 whether the corresponding lead guitar loop, rhythm guitar loop, and/or drum guitar loop. In this case, the computing devices 20a-20n will provide voting options with respect to the various loops. The computing devices 20a-20n may collect the votes from the lead guitarist, the rhythm guitarist, and the drummer and transmit the same to the server 22. The server 22 collects the votes from the computing devices 20a-20n and determines which loops should be removed or deleted. The corresponding loop information may also be removed or deleted when applicable.

Figure 4C:
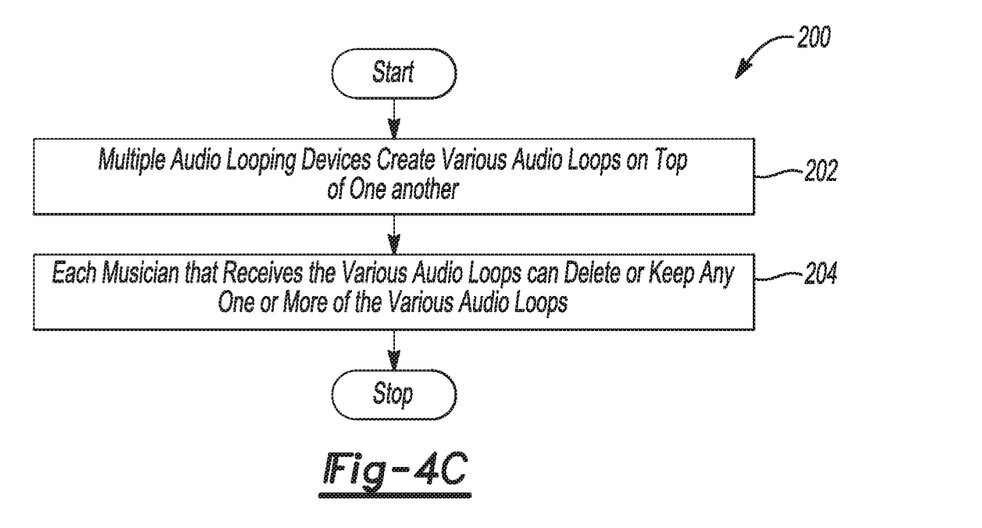

FIG. 4C depicts a method 200 for retaining or deleting various audio loops in accordance to one embodiment.

In operation 202, a multiple number of audio looping devices 18 generate or create various audio loops and corresponding loop information for particular instruments 14. As noted above, the lead guitarist may generate a lead guitar loop at the audio looping device 18a, the rhythm guitarist may generate a rhythm guitar loop at the audio looping device 18b, and the drummer may generate a drum loop at the audio looping device 18n. It is recognized that for each loop that is created, each will have corresponding loop information.

In operation 204, the corresponding loops and loop information generated in operation 202 are electronically transmitted to the various computing devices 20a-20n associated with the lead guitarist, the rhythm guitarist, and the drummer where each of these musicians 20 have the option of deleting or retaining any one or more of the lead guitar loop, the rhythm guitar loop, and/or the drum guitar loop via their respective computing device 20 (or their respective audio looping device 18). For example, the rhythm guitarist may select to retain the lead guitar audio loop and delete the drum loop at the computing device 20 (or at the audio looping device 18). If the selection is performed at the computing device 20 associated with the rhythm guitarist, then the computing device 20 transmits the selection to the audio looping device 18 where the drum audio loop and corresponding loop information is removed therefrom.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus comprising:
a first audio looping device being implemented as a foot pedal for switching by a first user and being electrically coupled to a computing device, the first audio looping device being programmed to:
receive a first audio signal from a musical instrument of the first user;
generate a first audio loop with the first audio signal for the first user prior to generating a second audio loop with a second audio looping device for a second user;
transmit via a transceiver position within the foot pedal, an electronic identification to the computing device to indicate that the first user is granted administrative privileges to revise a combined audio loop including the first audio loop and the second audio loop at the first audio looping device after generating the first audio loop and the second audio loop;
transmit the first audio loop to the second audio looping device with the computing device, the second audio looping device combining the first audio loop with the second audio loop to provide the combined audio loop; and
receive the combined audio loop from the second audio looping device via the computing device,
wherein the electronic identification enables the first user to remove the second audio loop from the combined audio loop at one of the computing device and the first audio looping device,
wherein the first audio looping device is further programmed to:
determine first loop information including a first loop length for the first audio loop after generating the first audio loop; and
transmit the first loop information to the second audio looping device along with the first audio loop such that the second audio looping device generates the combined audio loop at a loop length that is equal to the first loop length of the first audio loop since the first audio loop as been generated prior to the second audio loop and to the combined audio loop,
wherein the first audio looping device receives the combined audio loop from the second audio looping device at the loop length that is equal to the first loop length.

2. The apparatus of claim 1 wherein the first audio looping device is further programmed to receive a command from the computing device to store the combined audio loop.

3. The apparatus of claim 1 wherein the computing device enables the first user to listen to the combined audio loop prior to storing the combined audio loop on the first audio looping device.

4. The apparatus of claim 1 wherein the computing device includes a user interface to enable the first user to remove the first audio loop from the combined audio loop based on the electronic identification.

5. The apparatus of claim 1 wherein the first audio looping device is further programmed to receive a command from the first user of the first audio looping device after the computing device plays back the combined audio loop for the first user.

6. The apparatus of claim 1 wherein the first audio looping device is further programmed to transmit a first loop type for the first audio loop to the second audio loop, and wherein the first loop type includes an instantaneous stop type that corresponds to a command from the first user for the first audio loop to stop playback of the first audio loop before a start point of a next reoccurring first audio loop that is played back.

7. A computer-program product embodied in a non-transitory computer readable medium that is programmed to enable communication between a first audio looping device, a second audio loop and a computing device, the computer-program product comprising instructions to:

receive, at a first audio looping device that is implemented as a foot pedal for switching by a first user, a first audio signal from a musical instrument of the first user;

generate a first audio loop with the first audio signal for the first user prior to generating a second audio loop with a second audio looping device for a second user, wirelessly transmit via a transceiver positioned within the foot pedal, an electronic identification to the computing device to indicate that the first user is granted administrative privileges to revise a combined audio loop including the first audio loop at the computing device after generating the first audio loop;

transmit the first audio loop to the second audio looping device with the computing device, the second audio looping device combining the first audio loop with the second audio loop to provide the combined audio loop;

receive, at the first audio looping device, the combined audio loop from the second audio looping device via the computing device; and wherein the electronic identification enables the first user to remove the second audio loop from the combined audio loop at one of the computing device and the first audio looping device determine first loop information at the first audio looping device, the first loop information including a first loop length for the first audio loop; and transmit the first loop information to the second audio looping device along with the first audio loop such that the second audio looping device generates the combined audio loop at a loop length that is equal to the first loop length of the first audio loop since the first audio loop has been generated prior to the second audio loop and to the combined audio loop, wherein the first audio looping device receives the combined audio loop from the second audio looping device at the loop length that is equal to the first loop length.

8. The computer-program product of claim 7 further comprising instructions to receive a command at the first audio looping device from the computing device.

9. The computer-program product of claim 7 further comprising instructions to receive a command from a user of the first audio looping device after the computing device plays back the combined audio loop for the user.

10. The computer-program product of claim 7 further comprising instructions to generate a first loop type and a first tempo for the first audio loop.

11. An apparatus comprising:

a computing device being electrically coupled to a first audio looping device that is implemented as a foot pedal for switching for a first user, the first audio looping device is configured to (i) receive a first audio signal from a musical instrument of a first user, (ii) generate a first audio loop with the first audio signal prior to generating a second audio loop with a second audio looping device for a second user, and (iii) determine first loop information including a first loop length for the first audio loop after generating the first audio loop, the computing device being programmed to:

receive an electronic identification from a transceiver of the foot pedal the to indicate the first user to the computing device, the electronic identification being indicative of the first user having administrative privileges to revise a combined audio loop;

transmit the first audio loop to a second audio looping device that generates a second audio loop for a second user and combines the first audio loop with the second audio loop to provide a combined audio loop;

receive the combined audio loop from the second audio looping device; and playback the combined audio loop; and enable the first user to revise the combined audio loop based on the electronic identification, wherein the electronic identification enables the first user to remove the second audio loop from the combined audio loop at the computing device, and wherein the computing device is further configured to:

enable the first loop information to be transmitted to the second audio looping device along with the first audio loop such that the second audio looping device generates the combined audio loop at a loop length that is equal to the first loop length of the first audio loop since the first audio loop has been generated prior to the second audio loop and to the combined audio loop, transmit the combined audio loop from the second audio looping device to the first audio looping device such that the loop length of the combined audio loop generated at the second audio looping device is equal to the first loop length and the first audio looping device receives the combined audio loop from the second audio looping device at the loop length that is equal to the first loop length.

12. The apparatus of claim 11 wherein the computing device is further programmed to transmit a command to the first audio looping device to store the combined audio loop.

13. The apparatus of claim 12 wherein the computing device is further programmed to playback the combined audio loop prior to transmitting the command to the first audio looping device.

14. The apparatus of claim 11 wherein the computing device is further configured to revise the first audio loop and the second audio loop of the combined audio loop based on the electronic identification.

15. The apparatus of claim 14 wherein the computing device is further configured to remove the first audio loop from the combined audio loop based on the electronic identification after playing back the combined audio loop for the first user.

16. The apparatus of claim 11 wherein the computing device is further programmed to transmit the first audio loop to the second audio looping device via a server.

17. The apparatus of claim 11 wherein the computing device includes a user interface to revise the combined audio loop based on the electronic identification prior to storing the combined audio loop on the first audio looping device.

* * * * *